UNITED STATES PATENT OFFICE.

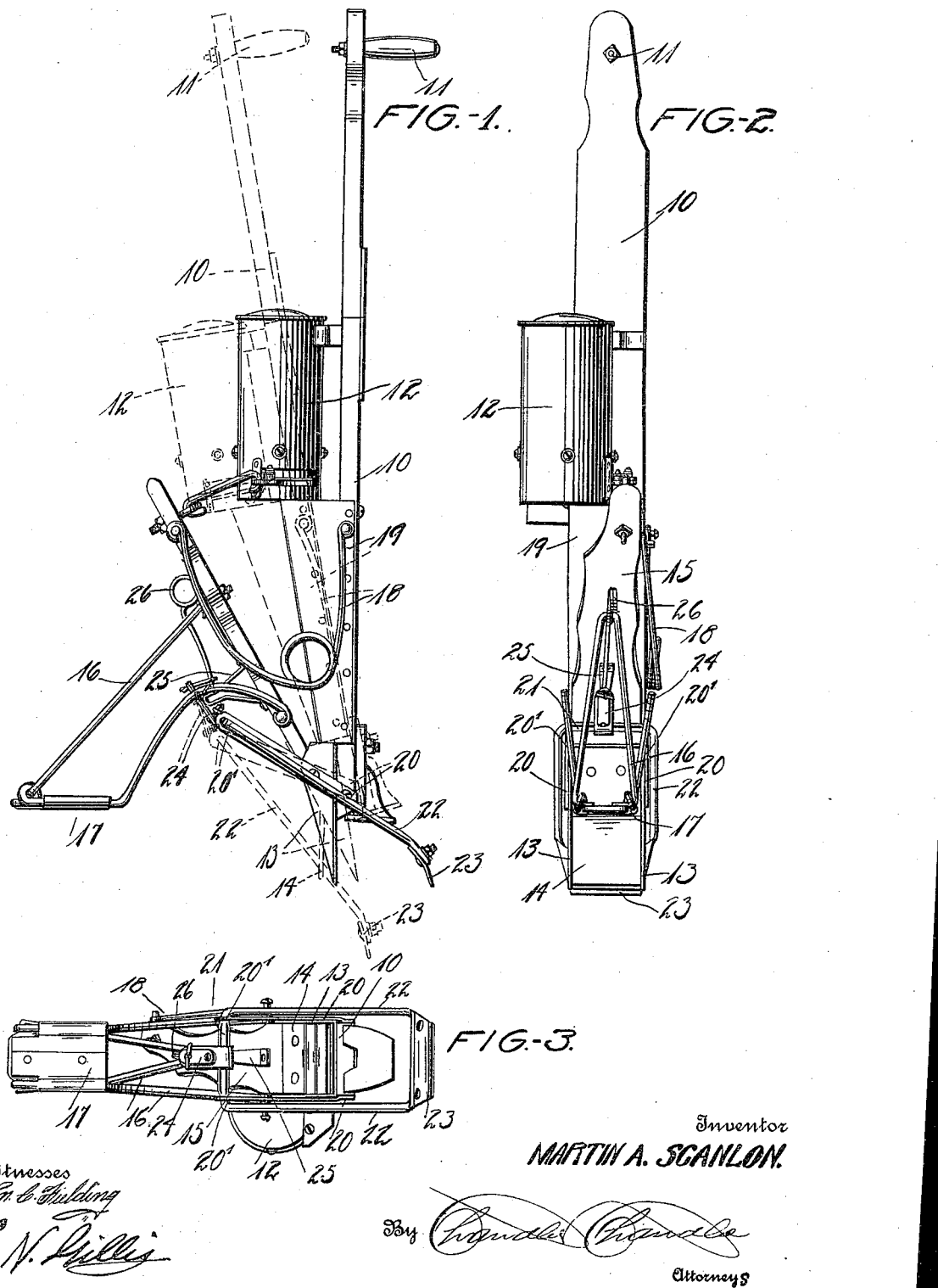

MARTIN A. SCANLON, OF MONTEZUMA, NEW YORK.

COVERING ATTACHMENT FOR HAND CORN-PLANTERS.

985,637.

Specification of Letters Patent. Patented Feb. 28, 1911.

Application filed May 24, 1910. Serial No. 563,200.

*To all whom it may concern:*

Be it known that I, MARTIN A. SCANLON, a citizen of the United States, residing at Montezuma, in the county of Cayuga, State of New York, have invented certain new and useful Improvements in Covering Attachments for Hand Corn-Planters; and I do hereby declare the following to be a full, clear, and exact description of the invention, such as will enable others skilled in the art to which it appertains to make and use the same.

This invention relates to corn planters and has special reference to a corn planter designed for manual use.

More particularly the invention relates to a hill covering attachment for such planters.

One object of the invention is to improve the general construction of hill covering attachments for hand planters.

With the above and other objects in view, the invention consists in general of certain novel details of construction and combinations of parts hereinafter fully described, illustrated in the accompanying drawings, and specifically set forth in the claims.

In the accompanying drawings, like characters of reference indicate like parts in the several views, and:—Figure 1 is a side elevation of a standard type of corn planter having this invention applied thereto, the view showing one position of the device in full lines and a second position in dotted lines. Fig. 2 is a front view of such a planter. Fig. 3 is a bottom view thereof.

In the drawings there is illustrated a well known form of hand planter wherein there is provided a standard 10, handle 11, seed box 12, stationary blade 13, movable blade 14, actuating lever 15, step frame 16 and step 17. In this form of corn planter the blades are normally held closed by means of a heavy spring 18, this position being shown in full lines in Fig. 1. When the device is in use the operator, carrying the planter in the right hand, places his right foot beside the hill to be planted and plunges the blades into the hill at the time of placing the foot. Without stopping he moves on toward the next hill and in doing so presses the handle forward and downward. This causes the step 17 to move the lever 15 against the action of the spring 18 and opens the blades so that the seed contained in the seed guide 19 are dropped into the ground. This operation leaves an open hill.

In the present invention a pair of arms 20 are secured to the bottom of the planter and project forward and slightly upward therefrom as indicated at 20'. These arms are provided with suitable openings at their forward ends and through these openings passes the bight 21 of a U-frame, the legs of which are indicated at 22. The legs of this U-frame project upwardly of the planter and on their extremities is secured a covering blade or plate 23. Fixedly secured to the bight of the U and extending in a direction opposite the legs is a bar 24 while upon the lever 15 is a presser 25 engaging against the bar.

At 26 is a strong spring but it is to be understood that this spring is weaker than the spring 18. One end of this spring is secured adjacent the free end of the lever 15 while the other end is secured to the extremity of the bar 24 so that the spring holds said bar against the presser 25.

Now, in the operation of this attachment, as the handle 11 is moved forward and the blades 13 and 14 lifted out of the earth the spring 26 acts to cause the blade 23 to move to the position shown in dotted lines in Fig. 1 and while this blade is thus moving it scrapes the earth into the hole left by the blades and thus covers the seed which have been dropped. As the device is picked up from the ground the heavy spring 18 causes the lever 15 to resume its original position while the spring 26 swings the U-frame and blade attached thereto back to its original position so that the device is again ready for a repetition of the operation. It is to be noted that the presser 25 forces the scraper blade to assume this position and that this is made possible by reason of the spring 18 being heavier than the spring 26.

There has thus been provided a simple and efficient device of the kind described and for the purpose specified.

Having thus described the invention, what is claimed as new, is:—

1. In a corn planter, a frame, planting blades, a frame pivoted to the lower end of said planter, a scraper blade carried by said frame, a spring connecting said lever and frame, said spring being arranged to move the scraper blade forward as the lever moves to open the first mentioned blades, and a rigid member on said lever bearing against said frame to force the same positively back as the lever moves to close said blades.

2. In a corn planter, planting blades, a blade operating lever, a frame pivoted forward of said blades and below said lever, said frame extending rearward of the blades, a scraper blade on the rear end of said frame, an arm projecting forward from said frame, a presser on said lever bearing against said arm, and a spring having one end connected to the lever and the other end to the arm, said spring constantly forcing the arm against said presser.

3. In a corn planter, planting blades, a blade operating lever, a frame pivoted forward of said blades and below said lever, said frame extending rearward of the blades, a scraper blade on the rear end of said frame, an arm projecting forward from said frame, a presser on said lever bearing against said arm, a spring having one end connected to the lever and the other end to the arm, said spring constantly forcing the arm against said presser, and a second spring adapted to close said blades.

4. In a corn planter, a standard, a fixed blade secured to said standard, a movable blade pivoted to said standard, a blade operating lever attached to said movable blade, a spring between said standard and lever to normally hold said blades closed, a step frame secured to said lever, a step carried by said step frame to bear against the ground and move said lever against said spring, a pair of bars projecting forwardly from said standard and provided with bearing openings in their forward ends, a U-shaped frame having its bight portion journaled in said openings and its legs projecting rearwardly behind said blades, a scraper blade secured to the extremities of said legs, a forwardly projecting arm fixed to the bight of the U-shaped frame, a presser fixed to said lever and engaging against said arm, and a second spring attached by one end to said lever and by the other end to said arm, said spring constantly holding said arm against the presser.

In testimony whereof, I affix my signature, in presence of two witnesses.

MARTIN A. SCANLON.

Witnesses:
L. N. GILLIS,
GEO. H. CHANDLEE.

---

Copies of this patent may be obtained for five cents each, by addressing the "Commissioner of Patents, Washington, D. C."